(12) United States Patent
Yang

(10) Patent No.: US 8,605,443 B2
(45) Date of Patent: Dec. 10, 2013

(54) VIBRATION ABSORBING DEVICE AND SERVER WITH THE SAME

(75) Inventor: Feng-Chi Yang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 140 days.

(21) Appl. No.: 13/400,856

(22) Filed: Feb. 21, 2012

(65) Prior Publication Data

US 2013/0107466 A1    May 2, 2013

(30) Foreign Application Priority Data

Nov. 1, 2011    (CN) .......................... 2011 1 0339800

(51) Int. Cl.
*H05K 5/00* (2006.01)

(52) U.S. Cl.
USPC ... 361/727; 361/679.01; 361/724; 312/223.1; 312/223.2

(58) Field of Classification Search
USPC .......................................................... 361/727
See application file for complete search history.

(56) References Cited

U.S. PATENT DOCUMENTS

2012/0155000 A1*    6/2012    Iwamoto et al. .......... 361/679.01

\* cited by examiner

*Primary Examiner* — Anthony Q Edwards
(74) *Attorney, Agent, or Firm* — Altis Law Group, Inc.

(57) ABSTRACT

A vibration absorbing device includes a main board having a pole, a first retaining board fixed to the main board, a second retaining board fixed to the first retaining board opposite to the main board, a loading board including a main body and a flange protruding from the main body, an elastic element located between the pole and the main body. A sliding groove and a compartment are both defined between the first retaining board and the second retaining board, the flange is located but slidable in the sliding groove, the main body is located in the compartment. The loading board can slide in the sliding groove in compliance with shocks or vibration, while the elastic element deforms and releases to absorb the motion of the loading board.

19 Claims, 4 Drawing Sheets

VIBRATION ABSORBING DEVICE AND SERVER WITH THE SAME

BACKGROUND

1. Technical Field

This disclosure relates to vibration absorbing devices, and in particular, to a vibration absorbing device for a server.

2. Description of Related Art

Servers include a plurality of components, and some of the components are connected together merely by friction force between the components. Such components may easily separate from each other during any transportation of the server itself.

Therefore, there is a room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the exemplary vibration absorbing device and server with the vibration absorbing device. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
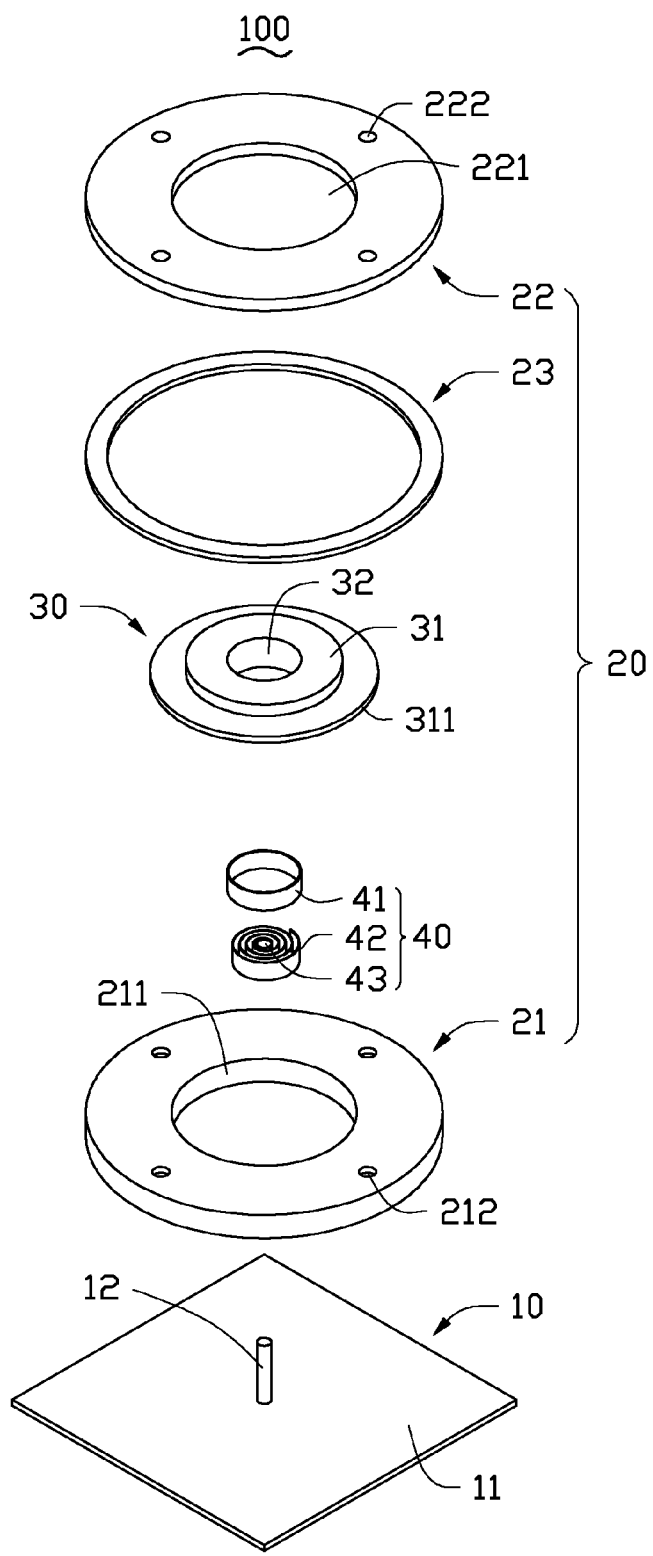
FIG. 1 is an exploded view of an exemplary vibration absorbing device.
Figure 2:
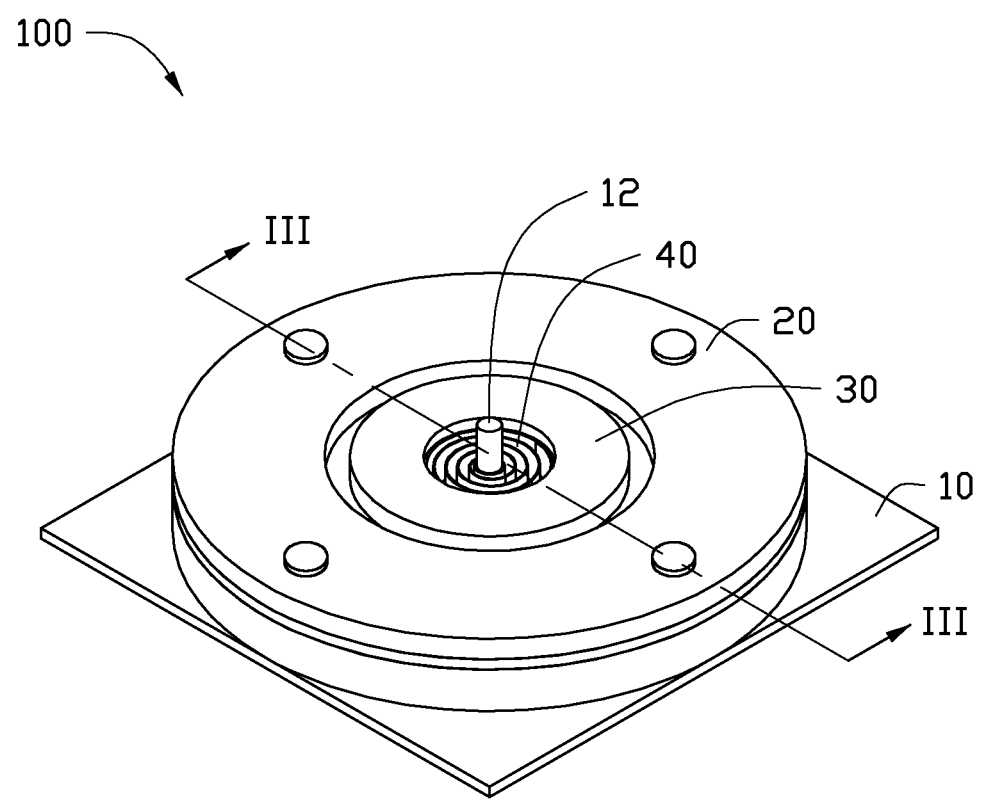
FIG. 2 is an assembled view of the vibration absorbing device of FIG. 1.

Referring to FIGS. 1 and 2, an exemplary embodiment of a vibration absorbing device 100 includes a main board 10, a retaining assembly 20, a loading board 30 and an elastic element 40. The retaining assembly 20 is fixed to the main board 10. The loading board 30 is secured to the retaining assembly 20 but movable. The elastic element 40 is fixed between the main board 10 and the loading board 30.

The main board 10 includes a surface 11 and a pole 12 protruding from the surface 11. The retaining assembly 20 includes a first retaining board 21, a second retaining board 22 and a buffer 23. The first retaining board 21 and the second retaining board 22 are both toroidal discs. The first retaining board 21 defines a first opening 211 and a plurality of first threaded holes 212 surrounding the first opening 211. The second retaining board 22 defines a second opening 221 aligned with the first opening 211, and a plurality of second threaded holes 222 surrounding the second opening 221 for alignment with the plurality of first threaded holes 212. The buffer 23 is also toroidal and fixed between the first retaining board 21 and the second retaining board 22 to create a gap between the first retaining board 21 and the second retaining board 22 so a sliding groove 24 (see FIG. 3) is formed between the first retaining board 21, the second retaining board 22 and the buffer 23.

The loading board 30 includes a main body 31, and a receiving groove 32 defined in the main body 31 along an axis of the main body 31. The main body 31 is a toroidal disc. The loading board 30 further includes a flange 311 protruding from a peripheral surface of the main body 31 and surrounding the main body 31.

The elastic element 40 includes an outer ring 41, a clockwork-type laterally wound spring (coil 42) and an inner ring 43. The outer ring 41 wraps and is fixed to an outer lateral surface of the coil 42, and the inner ring 43 is fixed in a center portion of the coil 42 so the coil 42 is fixed between the outer ring 41 and the inner ring 43.

Figure 3:
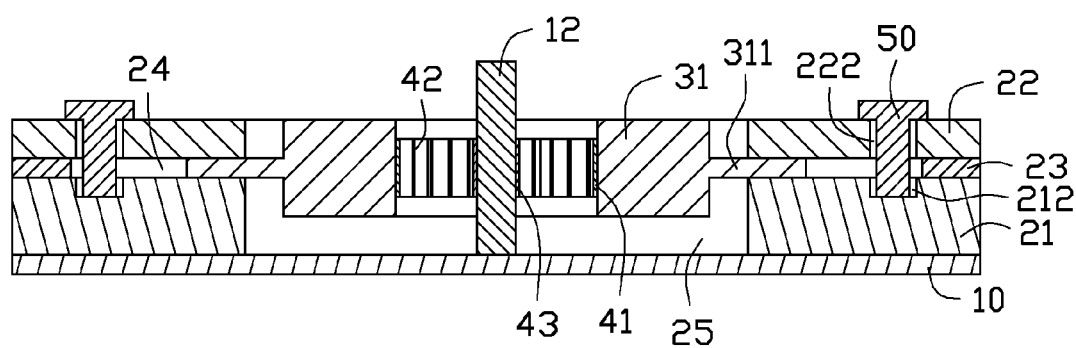
FIG. 3 is a cross sectional and partially enlarged view of the vibration absorbing device of FIG. 2 along the line of III-III.

Referring to FIGS. 2 and 3, in assembly, the first retaining board 21 is fixed to the surface 11 of the main board 10 with the pole 12 passing through the first opening 211. The buffer 23 is fixed to the first retaining board 21. The inner ring 43 is wrapped around and fixed to the pole 12, and the elastic element 40 is spaced from the surface 11. The loading board 30 is fixed to the first retaining board 21 with the pole 12 passing through the receiving groove 32 and the elastic element 40 located in the receiving groove 32 so the elastic element 40 is fixed in the main body 31. The second retaining board 22 is fixed on the buffer 23 so the buffer 23 is latched by the cooperation of the first retaining board 21 and the second retaining board 22, and the sliding groove 24 is formed between the first retaining board 21, second retaining board 22 and the buffer 23, in which the flange 311 is slidably located. In this situation, a compartment 25 is formed by the first opening 211 and the second opening 221 and surrounded by the sliding groove 24, in which the main body 31 and the elastic element 40 are both located. A plurality of screws 50 engage with the first threaded holes 212 and the second threaded holes 222 to adjustably fix the first retaining board 21 and the second retaining board 22 together. Adjustment of the first retaining board 21 and the second retaining board 22 relative to each other is achieved by tightening or loosening the screws 50. As a result, the friction force between the first retaining board 21, the second retaining board 22 and the flange 311 is adjustable, thereby adjusting the damping and vibration absorbing strength of the vibration absorbing device 100.

Figure 4:
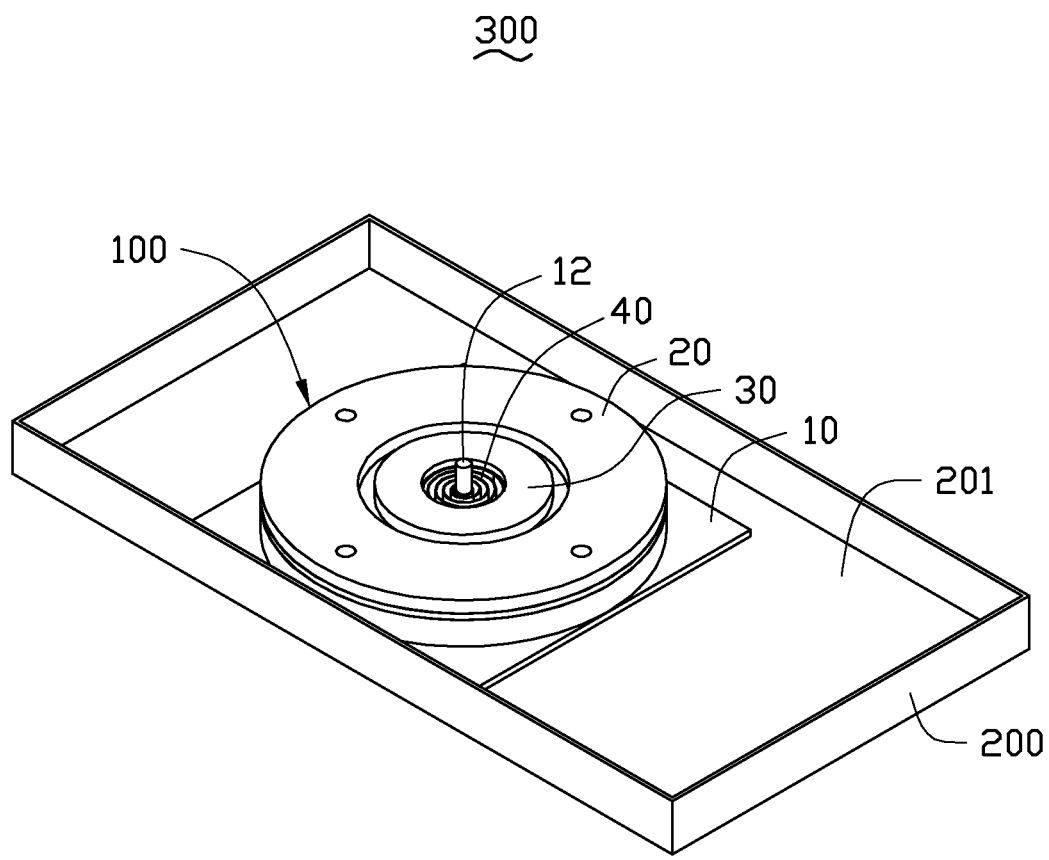
FIG. 4 is a schematic view of the vibration absorbing device of FIG. 2 mounted in a server chassis.

Referring to FIG. 4, a server 300 including a vibration absorbing device 100 and a chassis 200 is illustrated. The chassis 200 includes a mounting board 201, the main board 10 of the vibration absorbing device 100 is fixed to the mounting board 201. When the chassis 200 is subjected to vibration or shocks from outside, the vibration absorbing device 100 vibrates with the chassis 200 which drives the loading board 30 to slide in the sliding groove 24. The elastic element 40 is compressed and decompresses as quickly as necessary in absorbing the motion of the loading board 30, that is to say, all the external forces can be absorbed by the combination of the loading board 30 and the elastic element 40.

It is to be further understood that even though numerous characteristics and advantages of the exemplary embodiments have been set forth in the foregoing description, together with details of structures and functions of various embodiments, the disclosure is illustrative only, and changes may be made in detail, especially in the matters of shape, size, and arrangement of parts within the principles of the exemplary invention to the full extent indicated by the broad general meaning of the terms in which the appended claims are expressed.

What is claimed is:

1. A vibration absorbing device comprising:
   a main board having a pole protruding therefrom;
   a first retaining board fixed to the main board;
   a second retaining board fixed to the first retaining board opposite to the main board;

a loading board including a main body and a flange protruding from the main body; and an elastic element located between the pole and the main body;

wherein a sliding groove and a compartment are both defined between the first retaining board and the second retaining board, the flange is slidably located in the sliding groove, the main body is located in the compartment, during the loading board slides in the sliding groove, the elastic element is compressed to absorb the motion of the loading board.

2. The vibration absorbing device of claim 1, wherein the elastic element includes an outer ring, a coil and an inner ring; the outer ring wraps around and is fixed to an outer surface of the coil, and the inner ring is fixed in a center portion of the coil so the coil is fixed between the outer ring and the inner ring.

3. The vibration absorbing device of claim 2, wherein a receiving groove is defined in the main body along an axis of the main body, in which the elastic element is received.

4. The vibration absorbing device of claim 3, wherein the flange protrudes from an outer peripheral surface of the main body and surrounding the main body.

5. The vibration absorbing device of claim 1, wherein the first retaining board defines a first opening, the second retaining board defines a second opening, the compartment is cooperatively defined by the first opening and the second opening, the pole passes through the compartment.

6. The vibration absorbing device of claim 5, wherein a buffer is latched between the first retaining board and the second retaining board, the sliding groove is defined by the buffer, the first retaining board and the second retaining board.

7. The vibration absorbing device of claim 6, wherein the sliding groove surrounds the compartment.

8. A vibration absorbing device comprising:
a main board having a surface and a pole protruding from the surface;
a first retaining board fixed to the surface of the main board;
a second retaining board adjustably fixed to the first retaining board by a plurality of screws;
a loading board slidably fixed between the first retaining board and the second retaining board;
an elastic element located between the pole and the main body;
wherein during the screws are loosely or tightly screwed, a distance between the first retaining board and the second retaining board is adjusted to adjust a friction force between the first retaining board, the second retaining board and the loading board.

9. The vibration absorbing device of claim 8, wherein the elastic element includes an outer ring, a coil and an inner ring; the outer ring wraps and is fixed to an outer surface of the coil, and the inner ring is fixed in a center portion of the coil so the coil is fixed between the outer ring and the inner ring.

10. The vibration absorbing device of claim 9, wherein a receiving groove is defined in the main body along an axis of the main body, in which the elastic element is received.

11. The vibration absorbing device of claim 10, wherein the first retaining board defines a first opening, the second retaining board defines a second opening, a compartment is cooperatively defined by the first opening and the second opening, the pole passes through the compartment.

12. The vibration absorbing device of claim 11, wherein a sliding groove is defined between the first retaining board and the second retaining board, the flange is slidably located in the sliding groove, the main body is located in the compartment.

13. A server comprising:
a chassis; and
a vibration absorbing device fixed to the chassis, the vibration absorbing device comprising:
a main board having a pole protruding therefrom;
a first retaining board fixed to the main board;
a second retaining board fixed to the first retaining board opposite to the main board;
a loading board including a main body and a flange protruding from the main body; and
an elastic element located between the pole and the main body;
wherein a sliding groove and a compartment are both defined between the first retaining board and the second retaining board, the flange is slidably located in the sliding groove, the main body is located in the compartment, during the loading board slides in the sliding groove, the elastic element is compressed to absorb the motion of the loading board.

14. The server of claim 13, wherein the elastic element includes an outer ring, a coil and an inner ring; the outer ring wraps and is fixed to an outer surface of the coil, and the inner ring is fixed in a center portion of the coil so the coil is fixed between the outer ring and the inner ring.

15. The server of claim 14, wherein a receiving groove is defined in the main body along an axis of the main body, in which the elastic element is received.

16. The server of claim 15, wherein the flange protrudes from an outer peripheral surface of the main body and surrounding the main body.

17. The server of claim 13, wherein the first retaining board defines a first opening, the second retaining board defines a second opening, the compartment is cooperatively defined by the first opening and the second opening, the pole passes through the compartment.

18. The server of claim 17, wherein a buffer is latched between the first retaining board and the second retaining board, the sliding groove is defined by the buffer, the first retaining board and the second retaining board.

19. The server of claim 18, wherein the sliding groove surrounds the compartment.

* * * * *